(12) United States Patent
Rothman

(10) Patent No.: US 7,899,716 B2
(45) Date of Patent: Mar. 1, 2011

(54) SYSTEM AND METHOD FOR INTEGRATED PAYMENT AND SHIPPING INFORMATION

(75) Inventor: Simon Rothman, Palo Alto, CA (US)

(73) Assignee: Glyde Corporation, Palo Alto, CA (US)

( * ) Notice: Subject to any disclaimer, the term of this patent is extended or adjusted under 35 U.S.C. 154(b) by 472 days.

(21) Appl. No.: 11/963,601

(22) Filed: Dec. 21, 2007

(65) Prior Publication Data

US 2009/0164333 A1 Jun. 25, 2009

(51) Int. Cl.
*G06Q 30/00* (2006.01)

(52) U.S. Cl. ...................... 705/26.35; 705/27

(58) Field of Classification Search .................. 705/26, 705/27, 340

See application file for complete search history.

(56) References Cited

U.S. PATENT DOCUMENTS

| | | | |
|---|---|---|---|
| 6,490,567 B1 | 12/2002 | Gregory | |
| 6,564,213 B1 | 5/2003 | Ortega et al. | |
| 6,714,922 B1 * | 3/2004 | Sansone et al. | 705/406 |
| 6,839,690 B1 | 1/2005 | Foth et al. | |
| 7,111,252 B1 | 9/2006 | Harris | |
| 7,155,663 B2 | 12/2006 | Landsman et al. | |
| 7,197,475 B1 | 3/2007 | Lorenzen et al. | |
| 7,254,774 B2 | 8/2007 | Cucerzan et al. | |
| 7,266,513 B2 | 9/2007 | Chalmers et al. | |
| 2001/0054008 A1 | 12/2001 | Miller et al. | |
| 2002/0002527 A1 | 1/2002 | Holtzman | |
| 2002/0032668 A1 | 3/2002 | Kohler et al. | |
| 2002/0107820 A1 | 8/2002 | Huxter | |
| 2002/0107861 A1 | 8/2002 | Clendinning et al. | |
| 2002/0113815 A1 | 8/2002 | DeGross | |
| 2003/0020758 A1 | 1/2003 | Hinderks | |
| 2003/0023499 A1 | 1/2003 | Das et al. | |
| 2003/0065573 A1 * | 4/2003 | Nagel et al. | 705/26 |
| 2003/0200156 A1 | 10/2003 | Roseman et al. | |
| 2004/0193436 A1 * | 9/2004 | Stashluk et al. | 705/1 |
| 2005/0071249 A1 | 3/2005 | Nix et al. | |
| 2005/0144052 A1 | 6/2005 | Harding et al. | |

(Continued)

OTHER PUBLICATIONS

"GoShip.com Launches Service That Empowers Online Buyers to Choose Parcel Shipping Method and Allows Merchants to Cut Losses"; PR Newswire; Apr. 3, 2000.*

*Primary Examiner*—William Allen
*Assistant Examiner*—Resha Desai
(74) *Attorney, Agent, or Firm*—Kilpatrick Townsend & Stockton LLP

(57) ABSTRACT

A product distribution module integrated with a payment module. Actions in the distribution module trigger actions in the payment module. For example, a user clicking a "buy" button triggers the creation of a product mailer for a seller, and triggers the payment module to collect and hold the purchase price and shipping costs from the buyer. Acceptance of delivery by the buyer, or the expiration of a time-out period after tracking delivery by the distribution module, triggers release of the purchase price to the seller. A "shared responsibility" return method and system is also provided. The buyer has until a time out period to object to the product. If the buyer objects, in the buyer's discretion the product can be returned, but the buyer is required to pay a portion of the return shipping costs subject to an algorithm.

3 Claims, 3 Drawing Sheets

U.S. PATENT DOCUMENTS

2007/0208635 A1    9/2007  Van Luchene et al.
2007/0255644 A1*  11/2007  Elder .......................... 705/37
2008/0235042 A1*   9/2008  Boyd et al. ................... 705/1

* cited by examiner

SYSTEM AND METHOD FOR INTEGRATED PAYMENT AND SHIPPING INFORMATION

CROSS-REFERENCES TO RELATED APPLICATIONS

Related applications are Ser. No. 11/963,675, "Virtual Shelf with Single Product Choice and Automatic Multiple Vendor Selection"; Ser. No. 11/963,382, entitled "System and Method for Dynamic Product Pricing"; Ser. No. 11/963,711, entitled "Software System for Decentralizing eCommerce with Single Page Buy"; Ser. No. 11/963,718, entitled "3D Product Display on Internet with Content or Transaction Data on Back of Image"; Ser. No. 11/963,470, entitled "Product Distribution System and Method Thereof"; Ser. No. 11/963,592, "System and Method for Providing Real-Time Search Results on Merchandise"; all filed even date herewith.

BACKGROUND OF THE INVENTION

The present invention is directed to a method and system for payments from buyers to sellers on a multi-seller website, and for facilitating shipping, billing, and returning of merchandise.

With the advent of e-commerce, the Internet has become a vehicle for an increasing number of online transactions. In 2006, the online retail revenues in the United States are over a hundred billion dollars. While the business-to-customer (B2C) transactions make up the majority of this figure, customer-to-customer (C2C) transactions are gaining popularity. For example, e-commerce websites such as eBay and Craigslist facilitate millions of C2C transactions.

While the existing e-commerce websites provide useful tools for customers, they are vulnerable to various shortfalls. Among other things, the payment and returning policies of these websites are often unsatisfactory to customers. For example, Amazon Marketplace processes payment from the buyer and deposits it in the seller's payments account. The buyer is responsible for dealing directly with the seller if there is a problem. The buyer pays for shipment back to the seller, then the seller requests a refund using Amazon.com Payments.

eBay leaves it to individual sellers to handle how payments are received and processed. According to eBay's policy as posted on its web site, the buyer who is unsatisfied with merchandise(s) shipped from a seller needs to resort to a dispute process. Among other things, the buyer has to initiate a dispute process on eBay's website, and a dispute process ensues.

Paypal provides for payment from the buyer to the seller when an item is ordered, and an email is sent to the buyer's email address to confirm it was an authorized payment. If the goods don't arrive, or the wrong or damaged goods arrive, the buyer can use a PayPal dispute resolution process. PayPal also offers a Buyer Protection plan up to $2000 for items purchased on eBay.

Various methods have been developed for returning merchandise. For example, the United Parcel Service (UPS) filed a patent on a system and method for initiating returns over a network (U.S. Pat. No. 7,266,513). This patent describes an online return application that generates an electronic return shipping label that can be delivered to a browser of a customer that wishes to make a return. Also, disclosed is the creation and transmission of label delivery links, which provide for dynamic generation and delivery of shipping labels.

Pitney Bowes U.S. Pat. No. 6,839,690 describes a third party holding system for internet purchases between a buyer and seller. A process for negotiating a holding contract between the buyer and seller is provided. If the buyer uses a credit card, a fulfillment processor places a charge against the buyer's credit card. A carrier receives the bargained for goods from the seller and delivers them to the buyer. A processor monitors the carrier to determine when the goods have arrived. This triggers a timer. If the buyer either accepts or—does not notify the system before the agreed upon time period, the transaction is closed, and funds flow to the seller's account.

BRIEF SUMMARY OF THE INVENTION

The present invention provides a product distribution module integrated with a payment module. Actions in the distribution module trigger actions in the payment module. For example, a user clicking a "buy" button triggers the creation of a product mailer for a seller, and triggers the payment module to collect and hold the purchase price and shipping costs from the buyer. Acceptance of delivery by the buyer, or the expiration of a time-out period after tracking delivery by the distribution module, triggers release of the purchase price to the seller.

In an embodiment of the invention, a "shared responsibility" return method and system is provided. A product purchased over the Internet from a multi-seller website is delivered to a buyer, with the delivery monitored by the multi-seller website. The buyer has until a time out period to object to the product. At the buyer's discretion the product can be returned, but the buyer may be required to pay a portion of the return shipping costs subject to an algorithm.

The algorithm for the return shipping costs may typically split the costs between the seller and the buyer. However, the multi-seller website tracks the historical performance of sellers and buyers. If a buyer has a sufficiently high rating, and the seller a sufficiently low rating, the amount of return shipping costs borne by the buyer may be reduced to as much as zero. Alternately, the buyer may return the products to the multi-seller website, instead of the seller, so that product defects can be verified. If the defects are verified, the buyer's rating is not affected by the return, the seller's rating is downgraded, and up to all the shipping costs are borne by the seller.

In one embodiment, an integrated payment system is provided. The multi-seller website provides the functions of (1) maintaining accounts for both sellers and buyers, (2) providing shipping mailers for delivery and return, and (3) tracking delivery and return. Both seller and buyer can go to one site to track all aspects of the transaction, including payment and delivery. The user's sales proceeds are maintained in their respective accounts for future purchases through the multi-seller website. For example, a buyer can use funds in the buyer's account for a purchase. If there is a return, the buyer's account will be credited with the product cost, less the shipping costs from the seller and a portion of the shipping costs for the return. For other payment instruments, such as a credit card, a credit is provided through the credit card company to the buyer, rather than through the multi-seller website account.

Various additional objects, features and advantages of the present invention can be more fully appreciated with reference to the detailed description and accompanying drawings that follow.

DETAILED DESCRIPTION OF THE INVENTION

Overall System

Figure 1:
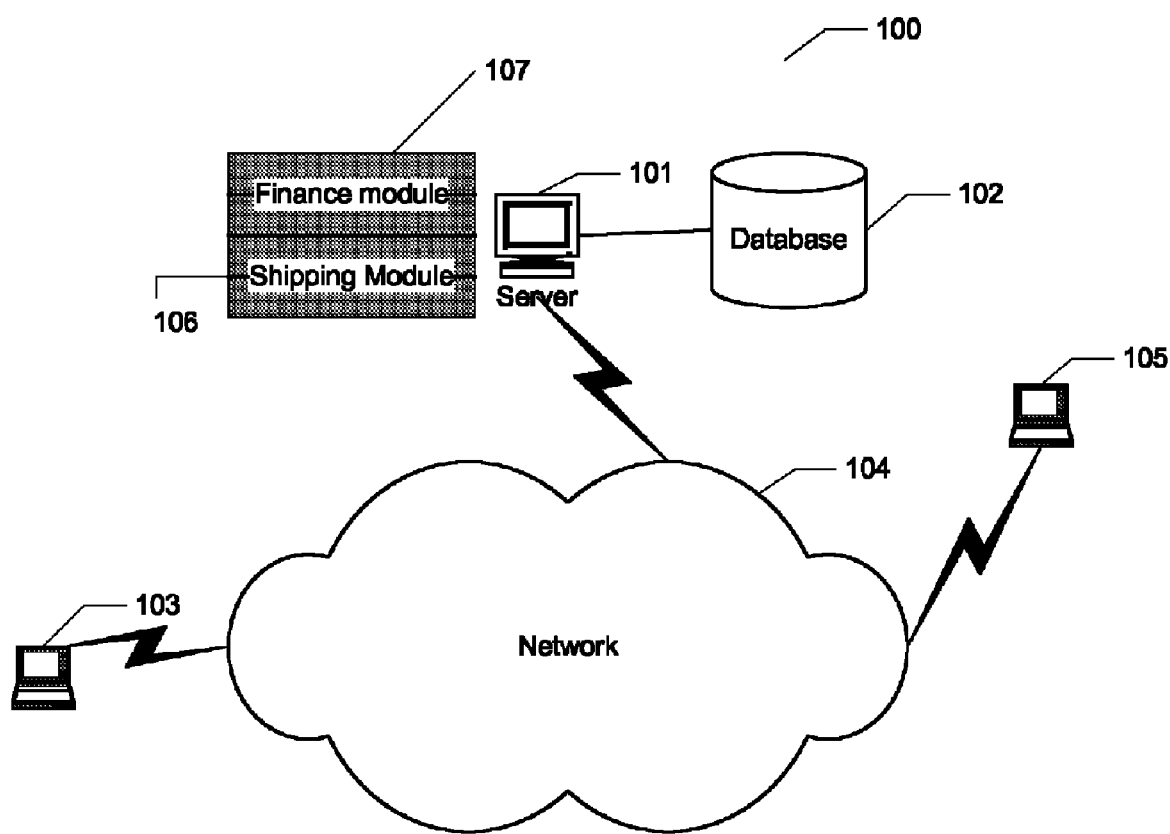
FIG. 1 is a simplified diagram illustrating a transaction system according to an embodiment of the present invention.

FIG. 1 is a simplified diagram illustrating a transaction system according to an embodiment of the present invention. This diagram is merely an example, which should not unduly limit the scope of the claims. One of ordinary skill in the art would recognize many variations, alternatives, and modifications.

As shown in FIG. 1, various entities are connected to one another through the network 104. For example, the network 104 is the Internet. The server 101 is used to facilitate communication and transactions that are performed between the terminals 103 and 105, which are used by individual sellers and buyers. For example, the server 101 is configured to list a variety of merchandise (e.g., DVDs, CDs, books, toys, PDAs, digital cameras, other electronics, etc.) for sale from individual sellers. According to an embodiment, the prices for the merchandise are set by the individual sellers based on recommendations suggested by the server 101. Note that the user may be an individual user, a large corporation, a smaller business, partnership, or other group, and others.

To facilitate transactions between individual buyers and sellers, the server 101 stores profile information of buyers and sellers in the database 102. For example, the profile information includes the past transaction history, buying preferences, merchandise to be bought or sold, etc. In various embodiments, buyers and sellers provide account information to the server 101 through the network 104 using the terminals. The server 101 stores the received information into the database 102. For example, a secured connection is provided between the server and the terminals to ensure that sensitive information (e.g., financial information, personal information, etc.) is securely transmitted.

In a specific embodiment, the server 101 is a part of a commercial website. For example, the commercial website lists merchandise and facilitates transactions. The server 101 stores information and provides an integrated payment and/or shipping system.

Also integrated within server 101 are a finance module 107 and a shipping module 106. The finance module 107 includes an account for the user. A user can be both a buyer and a seller. Money is held as virtual money in the account until the user decides to withdraw it. The virtual money can be used for purchases from other sellers, or for return fees or other expenses incurred on the website. The virtual money is the default payment method that is accessed first, unless overridden by the user. In addition to the virtual money in the account, payment information is stored, such as credit card, debit card, PayPal account information, etc. Finance module 107 also includes holding accounts, which are set up temporarily for each purchase, with money being held for a seller until confirmed and accepted delivery, as described below. In one embodiment, users can earn points or rewards, which are translated into virtual money in the user's account.

Shipping module 106 handles generating a mailer for the seller to use, with postage and tracking information already on it. The mailer is sent to the seller, who places the merchandise in the mailer and deposits it with the Post Office or other carrier. The tracking information is obtained from the carrier by the server 101 and may be provided for viewing by seller and buyer, as well as being put in emails to seller and buyer. The carrier can be the USPS, UPS, FedEx, DHL, or any other carrier. An example of a mailer and tracking system is set forth in application Ser. No. 11/963,470, "Product Distribution System and Method Thereof", which is hereby incorporated herein by reference.

Integrated Payment System

Figure 2:
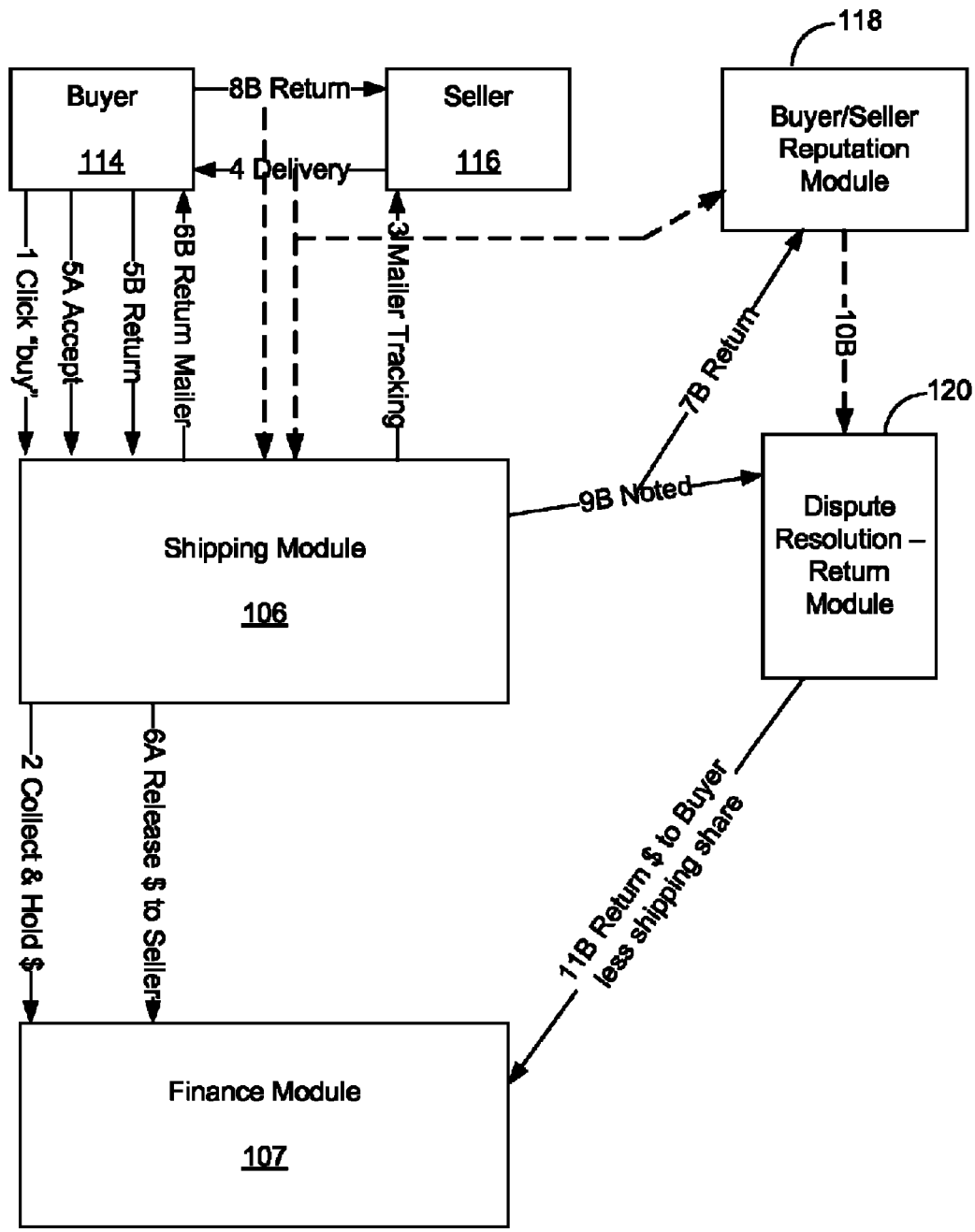
FIG. 2 is a block diagram of an integrated payment system according to an embodiment of the invention.

In a specific embodiment, the present invention provides an integrated payment system as illustrated in FIG. 2. Various functions of the integrated payment system are performed by various modules. Depending on the application, these modules can be implemented as a combination of computer hardware, software, and other facilities. FIG. 2 shows shipping module 106 and finance module 107 which interact with a buyer 114 and a seller 116. Also included are a buyer/seller reputation module 118 and a dispute resolution-return module 120.

The system includes a database (102 of FIG. 1), which can be a common database or separate databases associated with the different modules. The database is configured to store user accounts and user histories. The user accounts are associated with payment information and user reputation information. The system also includes a listing module on server 101 of FIG. 1 for providing a user interface and other functions. The user interface is adapted for listing and facilitating transactions of products on a website. For example, the user interface can be a web page listing a variety of products for sale. The products are listed by one or more sellers. The listing module is configured to receive a purchase order of a product and to record the purchase order by the buyer from a seller on the website. For example, a buyer can place a purchase order for the product listed on the user interface through a secured web page.

The integration of the modules is shown by the numbered arrows in FIG. 2. When buyer 114 clicks "buy" for a product (1), shipping module 106 is notified. The shipping module sends a notification (2) to finance module 107 to collect and hold money from the buyer. A mailer is generated and sent to the selected seller and is tracked (3). The seller 116 then delivers the product to the buyer (4). This causes a notification to the shipping module 106 through a tracking system, as indicated by a dotted line. It also provides data to buyer/seller reputation module 118, as also indicated by a dotted line, recording how promptly the seller shipped. If the product is accepted, a path A is followed, If it is to be returned, a path B is followed. Upon the buyer indicating acceptance, or the expiration of a time out period, a notification (5A) is provided to shipping module 106. A notification (6A) is then triggered to finance module 107 to release the purchase price to the seller (the shipping costs are held by the system of server 101).

If the buyer objects to the product and wants to return it, a notification (5B) is provided to shipping module 106). A return mailer is generated and sent to the buyer (6B). The reputation module 118 is notified of the return (7B), and the product is returned to the seller (8B). Upon receipt by the seller of the returned product (determined through mail tracking and/or seller notification), the dispute resolution-return module 120 is notified (9B). Based on a shared responsibility algorithm, which takes into account the seller and buyer reputations (10B), a notification (11B) is sent to the payment system for allocation of the delivery and return costs between the buyer and seller.

For example, the "shared responsibility" scheme is used in allocating the return cost, can allocate the cost of return shipping, or even the initial delivery costs, based on the relative reputations of the buyer and seller as tracked by the reputation module 120. The reputation module has the benefit of tracking information from shipping module 106, and thus doesn't need to rely on the word of the buyer or seller regarding delivery time, etc. By generating and delivering the mailers and tracking them, the reputations can be independently evaluated. For example, if a buyer consistently returns products from seller who has good reputation, the buyer's reputation may be lowered and more or all of the shipping costs can be allocated to the buyer.

Purchase and Return Process

Figure 3:
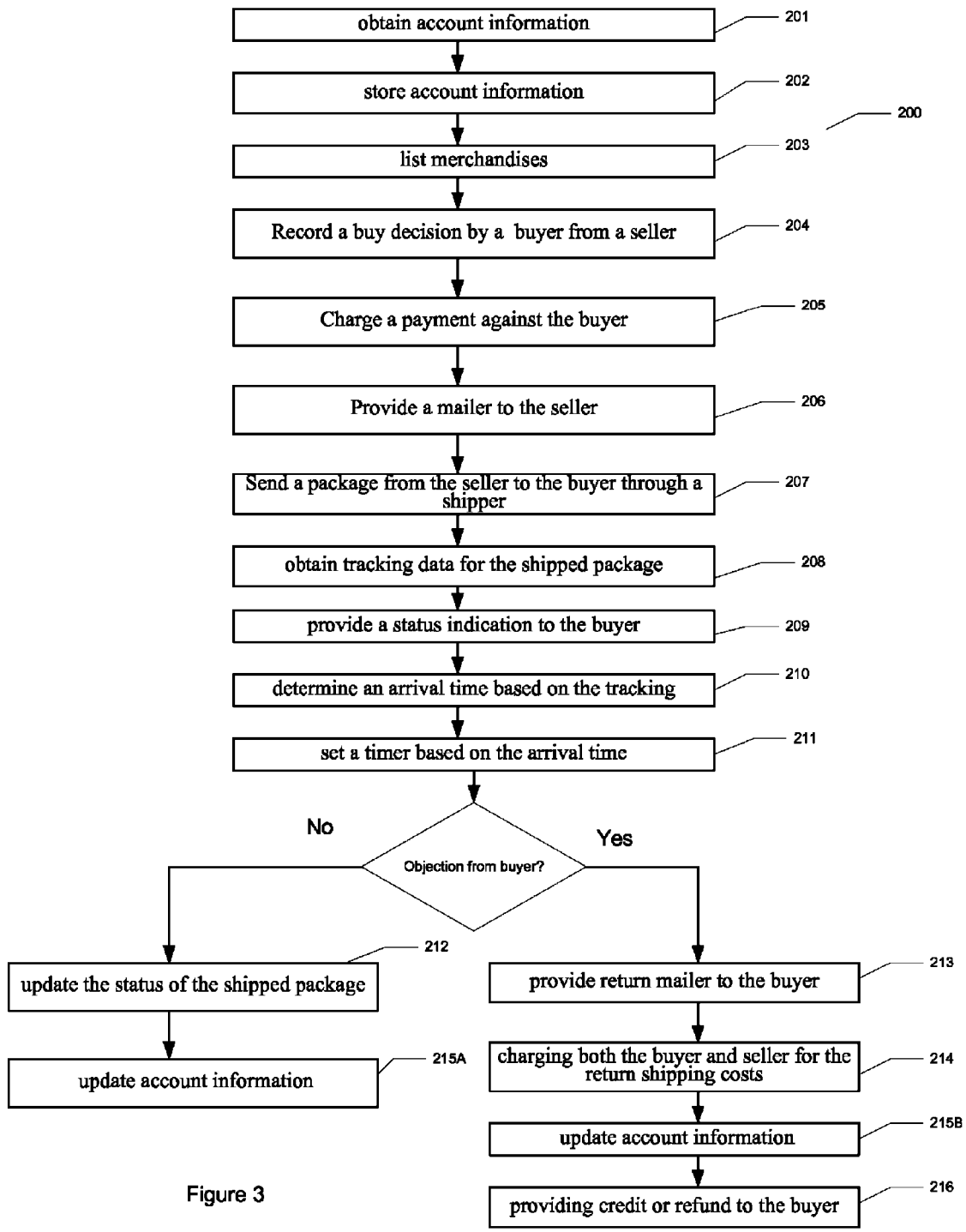
FIG. 3 is a simplified flow diagram illustrating a purchase through return process according to an embodiment of the present invention.

FIG. 3 is a simplified flow diagram illustrating a purchase through return process according to an embodiment of the present invention. This diagram is merely an example, which should not unduly limit the scope of the claims. One of ordinary skill in the art would recognize many variations, alternatives, and modifications. For example, various steps may be added, removed, replaced, modified, repeated, rearranged, and/or overlapped.

At step 201, account information is obtained from users. For example, the server 101 in FIG. 1 is configured to receive account information from users. The account information, among other things, may include users' financial information, transactional histories, user product preferences, user product ratings, etc. Depending on the application, account information may be retrieved in various ways, such as through the Internet, telephone, mail, etc. It is to be appreciated that that the system of the present has a wide range of applicability and is scalable.

At step 202, the financial account information is stored. In a specific embodiment, account information is stored in a secured database. For example, the database is accessible to the server, which updates the account information.

At step 203, merchandise is listed. For example, the merchandise may be media products, toys, electronics, services, etc. Depending on the application, the merchandise may be either from an individual seller, small business, big business, and/or a retail entity. The merchandise, when listed, is shown with description, prices, condition, and/or other characteristics. As merely an example, images of the item are also shown with the listed merchandise. In certain embodiments, information associated with sellers of the merchandise may also be displayed and listed. In an example, a virtual retail listing with a hidden, multi-seller backend is provided. A detailed description is provided in a related application Ser. No. 11/963,675, "VIRTUAL SHELF WITH SINGLE PRODUCT CHOICE AND AUTOMATIC MULTIPLE VENDOR SELECTION", which is hereby incorporated herein by reference.

At step 204, a buy (or other transaction) decision by a buyer is recorded. In an embodiment, the transaction involves the seller selling merchandises to the buyer. But it is to be understood that there might be other types of transactions as well. For example, the transaction may also include trading merchandise between a first entity and a second entity. As another example, the transaction may also involve rental or other activities.

Depending on the application, the transaction may be facilitated in various ways. According to an embodiment, the server provides detailed instruction to both the seller and the buyer for the transaction. The server additionally maintains financial and payment information from both parties to the transaction. The server stores contact information of the buyer and seller to allow handling the payment and shipping aspects of the transaction.

At step 205, the buyer is charged. In various embodiments, the payment is charged at the time when the buyer places an order for the merchandise. The default source of funds is the virtual account of the buyer, and when depleted, a designated credit card or other financial instrument or account. The server holds the payment in a holding account, and the payment is not credited to the seller until certain conditions (e.g., buyer received the package in a good condition) are satisfied. It is to be appreciated that such arrangement protects both the buyer and the seller for the transaction. For example, the debit of payment from the buyer's account ensures that a payment is available to the seller. Putting the payment in the holding account ensures that buyer may get a refund if the buyer is not satisfied with the merchandise.

At step 206, one or more mailers are provided to the seller. For example, a mailer includes a shipping label with the buyer address, postage, and tracking information. In a specific embodiment, the address of the buyer and/or seller may be anonymous. For example, if it is determined that the buyer wish to remain anonymous, the user name associated with the buyer's account (as opposed to the buyer's real name) is used for shipping.

At step 207, the seller sends the package to the shipper. For example, the seller drops off the package at a shipper, which may be UPS, USPS, DHL, FedEx, or others.

At step 208, tracking information is obtained. The carriers provide tracking of the package to the server 101.

At step 209, a status indication is provided to the buyer and seller. Depending on the application, the status indication may include various types of information. For example, an email to buyer and seller of the status indication may indicate that the merchandise has been shipped and provides an estimated arrival date. In a specific embodiment, the buyer (or seller) can go to the server webpage for information about their transactions. An image of the product bought is displayed. Upon clicking on the image, it is replaced with information including (1) the price paid, (2) the date purchased, (3) the estimated arrival date, and (4) delivery status (e.g., mailer sent to seller, deposited with carrier, en-route or other detailed information provided by the carrier, and delivered)

At step 210, the arrival time is determined based on the tracking information. Depending on the application, the arrival time may be actual and/or estimate. For example, the arrival time may be updated according to the confirmation that the merchandise(s) has been received.

At step 211, a timer is initiated based on the arrival time. More specifically, the timer is user to provide a time period within which the buyer may decide to return the package. For example, a buyer is given two days after the arrival time to inspect the merchandise and indicate to the server that the merchandise does not conform and therefore needs to be returned.

At step 212, if the buyer either does not provide any communication within the time set by the timer, or sends an affirmative message that the merchandise is acceptable, the funds are released from holding to the seller's account. The absence of communication from the buyer is construed as the buyer accepting the shipped merchandise.

At step 215, account information is updated. The account information of both the buyer and the seller are updated to reflect the completion of the transaction involving the shipped merchandise. Depending on the application, other information, such as buyer and/or seller ratings provided by the parties involved, may be used to update the account information. Ratings of buyer and seller can be adjusted, since the system tracks whether the seller promptly sent the merchandise and whether it was returned. Thus, an automatic rating of both seller and buyer is supported, without requiring action by either.

If the buyer objects to the merchandise, the buyer sends a communication (e.g., an email, or by clicking a button) to the server 101, or a check box on the user's transactions page is clicked. At step 213, a return mailer is sent to the buyer so the buyer can return the merchandise directly to the seller. In contrast to conventional schemes, where a dispute process is involved, embodiments of the present invention allow the buyer to return the shipped merchandise without providing any reasons. The buyer is discouraged from doing this frivolously because the buyer needs to share in the shipping costs for both the shipment to the buyer and the return to the seller. It is to be appreciated that such a return policy reduces the administrative overhead and potential friction between the buyer and the seller, thereby allowing an efficient and smooth transaction experience.

At step 214, both buyer and the seller are charged for the return shipping costs. It is to be appreciated that by charging both buyer and seller (preferably by an equal amount), the two sides share the shipping costs. In addition such a scheme reinforces the "shared responsibility" return policy and minimizes friction.

In a specific embodiment, a shipping cost distribution is determined based on the account information of buyer and the seller. For example, if the buyer has a good purchase history and the seller has a poor sales history, it is determined that the seller should bear a higher portion of the total shipping cost.

At step 215, account information is updated to reflect the returned merchandise. According to an embodiment, a repeated pattern of returning merchandise by a buyer, especially for the merchandise shipped from a seller with good history of past transactions, would adversely affect the buyer's record and/or account. For example, a buyer with too many "bad faith" returns and/or a pattern of repeated returns may be required to bear all the shipping costs or be suspended from using the service. As another example, if the buyer indicates that the shipped package includes illegal content (e.g., bootleg media product), a mailer will be sent to the buyer to forward the illegal content to the company. Among other things, remedies may include reporting to the authorities and/or expelling the seller from using the service. In addition to illegal content, a return to the operator may be done for verification of other defects, such as a DVD or CD with no content, an incorrect version of the product (which the operator can verify against the version listed).

At step 216, a refund is provided to the buyer. If the buyer's virtual account was debited, it is credited with the refund. If the buyer's credit card was debited, a credit is applied to the buyer's account, or would appear on the buyer's credit card statement.

Many benefits are achieved by way of the present invention over conventional techniques. For example, the present technique provides a novel mechanism for a buyer to return merchandise to a seller with minimal hassle. In various embodiments, the present invention provides a mechanism for smooth and efficient transaction, where a "shared responsibility" return policy is used. Among other things, instead of having parties in a transaction go through lengthy dispute processes, buyer and seller split the cost of return shipping. To speed things up, timers are used, which provides that if the buyer does not return and/or indicate a return within a predetermined time, the buyer is charged for the shipped merchandise. In addition, transactional history are recorded and used for future references. Furthermore, it is to be appreciated that various embodiments of the present invention are compatible with existing systems and can be implemented in a cost-effective manner. There are other benefits as well.

It is also understood that the examples and embodiments described herein are for illustrative purposes only and that various modifications or changes in light thereof will be suggested to persons skilled in the art and are to be included within the spirit and purview of this application and scope of the appended claims. Merely by way of an example, the invention has been applied to Internet commerce, but it should be understood that the present invention has a much broader range of applicability. Also, instead of providing a mailer to seller and buyer with tracking data, the sellers and buyers could be responsible for packaging and postage and for inputting tracking information to the server 101. Also, while "seller" and "buyer" are used in the claims, it is understood these terms can also refer to barterers, renters, or service providers and in the case of barterers the server 101 could generate mailers for both barterers to exchange products. Alternately, buyer and seller can refer to a leaser and lessee.

What is claimed is:

1. A method for returning a product ordered from a multi-seller website, comprising:
  receiving a communication from a buyer of the product requesting a return of the product to a seller of the product;
  providing a mailer with postage and tracking data to the buyer for return of the product; and
  allocating, with a computer, return shipping costs between the seller and the buyer, wherein a first portion of the return shipping costs are allocated to the buyer and a remaining portion of the shipping costs are allocated to the seller, wherein the amount of the first portion is determined based on the reputation of the buyer.

2. A method for returning a product ordered from a multi-seller website, comprising:
  receiving a communication from a buyer of the product requesting a return of the product to a seller of the product;
  providing a mailer with postage and tracking data to the buyer for return of the product; and
  allocating, with a computer, return shipping costs between the seller and the buyer, wherein a first portion of the return shipping costs are allocated to the buyer and a remaining portion of the shipping costs are allocated to the seller, wherein the amount of the first portion is determined based on the reputation of the seller.

3. A method for returning a product ordered from a multi-seller website, comprising:
  receiving a communication from a buyer of the product requesting a return of the product to a seller of the product;
  providing a mailer with postage and tracking data to the buyer for return of the product; and
  allocating, with a computer, return shipping costs between the seller and the buyer, wherein a first portion of the return shipping costs are allocated to the buyer and a remaining portion of the shipping costs are allocated to the seller, wherein the amount of the first portion is determined based on the reputation of both the buyer and the seller.

* * * * *